United States Patent
Kulangara et al.

(12) United States Patent (10) Patent No.: US 7,079,357 B1
(45) Date of Patent: Jul. 18, 2006

(54) ADDITIVE-PROCESS SUSPENSION INTERCONNECT WITH CONTROLLED NOISE

(75) Inventors: Sivadasan Kulangara, Temecula, CA (US); Amanullah Khan, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 0 days.

(21) Appl. No.: 11/268,986

(22) Filed: Nov. 7, 2005

Related U.S. Application Data (63) Continuation-in-part of application No. 10/159,418, filed on May 29, 2002, now Pat. No. 6,975,488.

(60) Provisional application No. 60/376,977, filed on Apr. 30, 2002, provisional application No. 60/721,302, filed on Sep. 28, 2005.

(51) Int. Cl.
 *G11B 5/48* (2006.01)

(52) U.S. Cl. .................................. 360/245.9

(58) Field of Classification Search ............ 360/97.01, 360/246, 244.2, 245.9
See application file for complete search history.

(56) References Cited

U.S. PATENT DOCUMENTS

| | | | |
|---|---|---|---|
| 5,805,382 A | 9/1998 | Lee et al. |
| 5,812,344 A | 9/1998 | Balakrishnan |
| 5,862,010 A | 1/1999 | Simmons et al. |
| 6,295,183 B1 | 9/2001 | Nuno et al. |
| 6,333,837 B1 | 12/2001 | Summers |

OTHER PUBLICATIONS

U.S. Appl. No. 11/233,156; filed Sep. 21, 2005; Inventors Sivadasan Kulangara and Amanullah Khan.

*Primary Examiner*—William J Klimuwicz
*Assistant Examiner*—Mark Blouin
(74) *Attorney, Agent, or Firm*—Louis J. Bachand (57) ABSTRACT

A disk drive electrical interconnect assembly and additive method therefor. The interconnect assembly has a supporting or fifth layer of metal, a fourth layer of a polyimide precursor or a polyimide with a first face directed away from the fifth layer, a third layer directly attached to the first face and defining a first subset of one or more conductive trace pair members, a second layer on the third and fourth layers of a polyimide precursor or a polyimide with a second face directed away from the third layer, and a first layer directly attached to the second layer and defining a second subset of one or more conductive trace pair members in spaced, paired and laterally offset relation respectively with one or more of the first subset pair members.

44 Claims, 5 Drawing Sheets

ADDITIVE-PROCESS SUSPENSION INTERCONNECT WITH CONTROLLED NOISE

CROSS-REFERENCE TO RELATED APPLICATIONS

This application is a continuation in part of application Ser. No. 10/159,418, filed May 29, 2002, now U.S. Pat. No. 6,975,488, which application claims the benefit of U.S. Provisional Application Ser. No. 60/376,977 filed Apr. 30, 2002. This application also claims the benefit of U.S. Provisional Application Ser. No. 60/721,302, filed Sep. 28, 2005. The disclosures of these applications are hereby incorporated in this application.

BACKGROUND OF THE INVENTION

1. Field of the Invention

This invention relates to disk drive suspensions, and more particularly to disk drive suspensions including an electrical interconnect assembly adapted to be supported on a load beam, and to interconnect assemblies in combination with a load beam. The invention suspensions and interconnect assemblies provide enhanced performance through the optimized control of noise caused by impedance differences along the interconnect by spacing laterally the normally vertically superimposed signal forward and return paths of the read or write circuits, and, in some cases, adding a grounding layer between the conductive traces and the load beam. More specifically, the interconnect assemblies herein are fabricated using an additive process for increased efficiency in locating the several laterally offset trace conductors that characterize the invention.

2. Description of the Related Art

Disk drive interconnect assemblies in wireless suspensions are known that comprise plural pairs of trace conductors carried on a plastic insulative layer to form part of read and write circuits supported by a load beam. These trace conductor pairs are subject to noise from reflected impedance variations that degrades the integrity of the signals being sent through the trace conductors. Other impedance changes occur when the spacing of the trace conductors from the load beam changes over the mutual extents of the trace conductors and the metal load beam. Past efforts to control impedance through windowing, the removal of portions of metal locally opposite the trace conductors, appears to contribute to further local variations in impedance values.

BRIEF SUMMARY OF THE INVENTION

Fabrication of these disk drive suspension electrical interconnect assemblies using subtraction processes has been difficult, limited and costly in terms of obtaining varied starting material, handling and in precision results. It is an object of the present invention to provide an improved disk drive suspension having an electrical interconnect fabricated by an additive process. It is a further object to provide an electrical interconnect for a disk drive suspension having noise control, including control of cross talk set up in one trace by changes in impedance in an adjacent trace, through management of impedance variations by opposing the read and or write circuit pair members in a novel manner involving offset partly or fully of the opposed pair members centerlines, and/or edges. Other variations in impedance stemming from changes in the distance between the traces and load beam are reduced or eliminated by reducing the effect of the load beam spacing through the use of a grounding layer of metal at a fixed spacing from the trace conductors. In this way the trace conductors are maintained at a fixed spacing from a conductor although the traces are at varying spacing from the load beam. A further object includes providing forward and return path read and write conductive traces that are relatively laterally offset to differentially control impedance between the pair members of the read and/or write pairs. The objects of the invention thus include provision of an electrical interconnect geometry through an additive fabrication technique that enhances electrical coupling between the forward and return paths of a differential circuit thereby making it less sensitive to exterior factors, noise and cross-talk, provision of a geometry that allows enhancement of capacitive coupling between the forward and return paths of a differential circuit, thereby making possible the realization of very low impedance interconnects, provision of a vertically stacked interconnect geometry that allows more circuits to be packed in a given area, provision of a shield that is electrically commonly grounded with the load beam to nearby metallic objects and supports the interconnect structure and that maintains a constant spacing from the differential circuit, the shield protecting the differential circuits from impedance variations caused by a non-uniform attachment process with the metallic supports, such as load beams and arms, provision of ripple-free differential (characteristic) impedance through homogenous shielding and uniform trace cross-sectional geometry, provision of smooth (continuous) control of differential impedance by setting the offset parameter to the desired value, provision of impedance control in which changing the impedance of a certain differential pair does not significantly affect the impedance of adjacent pairs, and provision of a flexure through the interconnect assembly. A further object is provision of additive methods of fabricating such interconnects, and the interconnect products of these methods.

These and other objects of the invention to become apparent hereinafter are realized in an electrical interconnect assembly, suitably attached to a load beam, or adapted to be supported on a disk drive suspension load beam, the interconnect assembly comprising a read pair of forward and return path conductive traces bracketing an insulative layer, and a write pair of forward and return path conductive traces bracketing an insulative layer, at least one of the read and write pairs having its forward and return path conductive traces being relatively laterally offset.

In this and like embodiments of the invention, typically, the read and write conductive traces bracket adjacent portions of a common electrically insulative layer, the conductive traces comprise copper, the write pair of forward and return path conductive traces are relatively laterally offset, have substantially the same lateral extent, and are sufficiently greatly laterally offset as to not oppose each other across the insulative film, e.g. such that the lateral offset distance between the write path forward and return path conductive traces is less than the lateral extent of the conductive traces. Typically, the write path conductive trace lateral offset is toward the read path conductive traces. Either the top trace conductor or the bottom trace conductor of the write pair can be offset toward the read pair.

The read pair of forward and return path conductive traces, and both the read and write pairs can be treated as just described for the write pair of conductive traces mutatis mutandis in further embodiments of the invention.

In further embodiments, both the write pair and the read pair of forward and return path conductive traces are relatively laterally offset, the respective conductive traces of the write pair and the read pair forward and return paths have substantially the same lateral extent within the pairs, and substantially the same or different lateral extent between the pairs, both the write pair and the read pair path forward and return path conductive traces are sufficiently greatly laterally offset as to not oppose each other across the insulative layer, the lateral offset distance between the write path, the read path, or both the write path and the read path forward and return conductive traces is less than the lateral extent of the conductive traces, the lateral offset distances respectively between the write pair forward and return path conductive traces and the read pair forward and return path conductive traces is less than the lateral extent of the conductive traces making up the pair, and the read and write path conductive trace lateral offsets are toward the write and read path conductive traces respectively.

In a further embodiment, the above electrical interconnect assembly further comprises a metal layer adapted for grounding, the metal layer being mounted on the insulative layer in fixed spaced relation to the conductive traces to be between the assembly and the load beam.

In a still further embodiment both the write pair and the read pair of forward and return path conductive traces are relatively laterally offset, and one or both of the respective conductive traces of the write pair and the read pair forward and return paths have substantially the same lateral extent within the pairs, and substantially the same or different lateral extent between the pairs, one or both of the write pair and the read pair path forward and return path conductive traces are sufficiently greatly laterally offset as to not oppose each other across the insulative layer, the lateral offset distance between the laterally offset write or read path forward and return path conductive traces that are offset is less than the lateral extent of the greater extending of the conductive traces, the lateral offset distance between the write or read path forward and return path conductive traces that are offset is less than the lateral extent of the conductive traces, at least one of the read and write path conductive trace lateral offsets are toward the write and read path conductive traces respectively.

In a further embodiment, the foregoing assembly can be in combination with a load beam comprised, e.g., of stainless steel. In this and like embodiments, the assembly can further comprise a metal layer adapted for grounding, the metal layer being mounted on the insulative layer in fixed spaced relation to the conductive traces to be between the assembly and the load beam, and the read and write pairs have the above-described characteristics.

The invention further provides a disk drive suspension comprising a metal load beam and an electrical interconnect assembly as described above including the interconnect assembly comprising an insulative layer, a read pair of forward and return path conductive traces bracketing a first portion of the insulative plastic film, a write pair of forward and return path conductive traces bracketing a second portion of the insulative layer, the read and write pairs of conductive traces being covered with a third portion of the insulative layer, and a metal layer adapted for grounding and mounted on the insulative plastic film in fixed spaced relation to the conductive traces to be between the assembly and the load beam, whereby the metal layer shields the traces from variations in impedance occasioned by varying distances between the electrical interconnect and the load beam.

The invention further provides a disk drive suspension comprising a metal load beam and an electrical interconnect assembly, wherein the interconnect assembly comprises an electrically insulative layer, a read pair of forward and return path conductive traces, a write pair of forward and return path conductive traces, the read and write pairs of conductive traces being supported by the insulative layer, and a metal layer adapted for grounding and mounted on the insulative plastic film in fixed spaced relation to the conductive traces to be between the assembly and the load beam, the insulative layer surrounding the conductive traces opposite the metal layer, whereby the metal layer shields the traces from variations in impedance occasioned by varying distances between the electrical interconnect and the load beam.

In a further embodiment, the invention provides a disk drive suspension electrical interconnect assembly adapted to be supported on a disk drive suspension load beam and comprising a fourth layer that can be temporarily supported on a removable fifth layer, the fourth layer comprising a polyimide precursor or a polyimide, the fourth layer having a first face, a third layer directly attached to the first face, the third layer comprising a first subset of one or more conductive trace pair members, a second layer on the third and fourth layers, the second layer comprising a polyimide precursor or a polyimide, the second layer having a second face, and a first layer directly attached to the second layer, the first layer comprising a second subset of one or more conductive trace pair members in spaced, paired and laterally offset relation respectively with the one or more first subset pair members. This assembly can be in combination with a load beam, and there can further be provided a grounding metal layer between said assembly and said load beam.

In its method aspects, the invention provides a method of making a disk drive suspension comprising a load beam and an electrical interconnect assembly, including supporting on an insulative layer adjacent the load beam a read pair of forward and return path conductive traces and a write pair of forward and return path conductive traces, covering the read and write pair conductive traces opposite the load beam with a further insulative layer, and attaching a metal layer adapted for grounding to the further insulative layer in fixed spaced relation to the conductive traces to be between the assembly and the load beam.

In a further embodiment, the invention provides a method of making a disk drive suspension electrical interconnect assembly, including supporting on an insulative layer a read pair of forward and return path conductive traces in insulative layer bracketing relation to a first portion of the insulative layer and a write pair of forward and return path conductive traces in bracketing relation to a second portion of the insulative layer, and relatively laterally offsetting the conductive traces of at least one the read and write pairs.

In a further embodiment, the invention provides a method of making a disk drive suspension comprising a metal load beam and an electrical interconnect assembly, including supporting on an insulative plastic layer a read pair of forward and return path conductive traces and a write pair of forward and return path conductive traces, relatively laterally offsetting the conductive traces of at least one of the read and write pairs, and attaching a metal layer adapted for grounding to the insulative plastic layer in fixed spaced relation to the conductive traces to be between the assembly and the load beam.

In a further method embodiment, the invention provides a method of making a disk drive suspension electrical interconnect assembly, including supporting on an insulative plastic layer a read pair of forward and return path conductive traces in layer bracketing relation and a write pair of forward and return path conductive traces in layer bracketing relation, and relatively laterally offsetting the conductive traces of at least one of the read pair and said write pair. This and similar ones of the method embodiments typically further including attaching a conductive metal layer to the insulative plastic layer in fixed spaced relation to the conductive traces, and grounding the metal layer in the installed condition of said electrical interconnect in a disk drive suspension.

In its additive fabrication aspects, the invention provides a method of fabricating a disk drive suspension interconnect assembly, including providing a fifth layer comprising metal, depositing onto the fifth layer a fourth layer comprising a polyimide precursor, converting the fourth layer to polyimide having a first face directed away from the fifth layer, forming a third layer comprising a first subset of one or more conductive trace pair members directly attached to the first face, depositing onto the fourth and third layers a second layer comprising a polyimide precursor and converting the second layer to polyimide having a second face directed away from the third layer, and forming a first layer comprising a second subset of one or more conductive trace pair members directly attached to the second face in spaced, paired and laterally offset relation respectively with the one or more first subset pair members.

Typically, in this and like embodiments, there can be included adding a zero layer comprising an electrically insulative material onto the first and second layers.

In further aspects of the invention, the conductive trace members each have a center line, and there is included also laterally offsetting the centerlines of at least one of the paired members in lateral offset defining relation, laterally offsetting the centerlines of each of the paired members in lateral offset defining relation, having the conductive trace members each have left and right edges, and there is also included laterally offsetting at least one left or right edge of each the paired member in lateral offset defining relation, laterally offsetting both the left and right edges of at least one of the paired members, laterally offsetting at least one left and right edge of each of the paired members in lateral offset defining relation, or laterally offsetting both the left and right edges of at least one of the paired members.

In a further aspect, this embodiment of the invention method further includes each conductive trace member having a center line, and includes also laterally offsetting the centerlines of at least one of the paired members in lateral offset defining relation, and laterally offsetting the centerlines of each of the paired members in lateral offset defining relation.

In another aspect, the method includes selecting a polyamic acid as the polyimide precursor in the above embodiments, and converting the polyamic acid e.g. by dehydration to a polyimide.

The mentioned zero layer can be added onto the first and second layers and can comprise an electrically insulative material, and, for the purpose, the invention methods includes selecting a polyimide precursor as the zero layer, such as a polyamic acid, and converting the polyamic acid to a polyimide.

In a further aspect the invention method in some embodiments includes attaching a metal layer adapted for grounding to the interconnect assembly in fixed spaced relation to the conductive trace pair members.

In a further embodiment, the invention method includes the method of fabricating a disk drive suspension interconnect assembly, including providing a temporary and removable supporting fifth layer, depositing onto the fifth layer a fourth layer comprising a polyimide precursor, converting the fourth layer to polyimide having a first face directed away from the fifth layer, forming a third layer comprising a first subset of one or more conductive trace pair members directly attached to the first face, depositing onto the fourth and third layers a second layer comprising a polyimide precursor and converting the second layer to polyimide having a second face directed away from the third layer, forming a first layer comprising a second subset of one or more conductive trace pair members directly attached to the second face in spaced, paired and laterally offset relation respectively with the one or more first subset pair members, and removing the fifth supporting layer. This embodiment can further include selecting a metal layer adapted for grounding as the fifth layer and maintaining the fifth layer on the interconnect assembly in fixed spaced relation to the conductive trace pair members.

In apparatus terms, the invention further provides a disk drive suspension electrical interconnect assembly adapted to be supported on a disk drive suspension load beam, the interconnect assembly comprising a fifth layer comprising metal, a fourth layer on the fifth layer, the fourth layer comprising a polyimide precursor or a polyimide, the fourth layer having a first face directed away from the fifth layer, a third layer directly attached to the first face, the third layer comprising a first subset of one or more conductive trace pair members, a second layer on the third and fourth layers, the second layer comprising a polyimide precursor or a polyimide, the second layer having a second face directed away from the third layer, and a first layer directly attached to the second layer, the first layer comprising a second subset of one or more conductive trace pair members in spaced, paired and laterally offset relation respectively with the one or more first subset pair members.

The above electrical interconnect assembly can be combined with a supporting load beam.

In the above and like embodiments, typically, the fourth layer and the second layer comprise polyimide, and the conductive traces comprise copper. In the case of write pairs, first and second subsets of conductive trace pair members define a write pair of forward and return path conductive traces and a read pair of forward and return path conductive traces, the write pair of traces having centerlines that are relatively laterally offset, the write pair forward and return path conductive traces have substantially the same lateral extent, the write pair forward and return path conductive traces have left and right edges, the trace edges being sufficiently greatly laterally offset that the traces do not oppose each other, the lateral offset distance between the write path forward and return path conductive traces is less than the lateral extent of the less wide of the conductive traces, the write path conductive trace lateral offset is toward the read path conductive traces.

In the case of read pairs, the read pair forward and return path conductive traces have centerlines that are relatively laterally offset, the read pair forward and return path conductive traces have substantially the same lateral extent, the read pair forward and return path conductive traces have left and right edges, the trace edges being sufficiently greatly laterally offset that the traces do not oppose each other, the read path conductive trace lateral offset is toward the write path conductive traces.

Considering both read and write pairs, the invention electrical interconnect assembly typically has the respective conductive traces of the write pair and the read pair forward and return paths with substantially the same lateral extent within the pairs, and substantially the same or different lateral extent between the pairs.

In a further embodiment, the invention provides an electrical interconnect assembly further comprising a metal layer adapted for grounding in fixed spaced relation to the conductive traces to be between the assembly and the load beam.

In a specific embodiment, the invention provides an electrical interconnect assembly in which one or both of the write pair and the read pair of forward and return path conductive traces have centerlines and left and right edges, at least one of the centerlines, left edges and right edges of the conductive traces being relatively laterally offset.

This and like embodiments further can be put into combination with a load beam, and can further comprise the noted zero layer atop the second and first layers, the zero layer comprising an electrically insulative material, generally comprising a polyimide.

BRIEF DESCRIPTION OF THE SEVERAL VIEWS OF THE DRAWINGS

The invention will be further described in conjunction with the attached drawings in which.

DETAILED DESCRIPTION OF THE INVENTION

Disk drive interconnects supporting read and write channels demand controlled and constant impedance over the trace circuit path lengths between the pre-amplifier integrated circuit (IC) and the read-write (R/W) head.

For interconnects having multi-layered laminated structure, a common method for varying impedance has been by having present or not a metal sheet backing or support below the conductors at prescribed intervals. In a typical situation the write trace pair is required to have higher impedance than the read pair. The manufacturer uses "windowing" to provide a sequence of "backed" and "unbacked" portions create windowed sections, characterized by less or no metal backing, beneath the read and write traces.

It has been found, however, that the use of an arrangement of backed and un-backed portions causes local variations in impedance, this even where their spacing is kept smaller than the signal wavelength. Such fluctuations are not desirable.

As is known, capacitance (which plays a major role in determining the impedance) of a conductor, varies as a function of its proximity with nearby conductive objects. In the windowing method, impedance control is achieved by changing the spacing between the traces and the nearest metallic surface from to reduce their capacitance. In a typical suspension, however, this provides only a small range of capacitance control because the nearest metal object, the load beam which is the one metal object that is most influential in controlling capacitance can not be far removed.

Further, removing the metal backing variably affects spacing because of possible warping or sagging of the unsupported structure. Spacing variations can give rise to additional ripples in the trace impedance.

Laminated head suspension systems having multiple conductor layers can comprise three layers including top and bottom layers consisting of metallic (preferably copper) traces and a thin insulating layer such as a plastic layer or film preformed or formed in situ sandwiched between them. These layers can be formed by additive or subtractive processes; that is by building up the several layers into a laminate assembly, or by taking a laminate assembly and selectively removing portions of the layers until the desired assembly is achieved. In a typical case, a pair of upper and lower traces facing each other across the insulative film layer form a single circuit, be it a read or a write circuit.

In forming these traces by a subtractive process, it is usual that chemical etching does not produce traces having perfectly rectangular cross sections. Rather the cross section is trapezoidal. In any case, the flat surfaces of the traces facing each other make a strong electrical coupling between the forward and the return paths of the circuit. By design, this coupling can be enhanced so that it dictates most of the electrical characteristics of the differential pair.

In various embodiments, an insulating layer, a fourth layer, may be coated over the lower metal layer and a further conductive layer deposited over that insulation layer to provide a five-layer structure that is supported by the load beam. Deposition of the added metal layer can be by sputtering or by electrolytic means, or a metal foil can be used.

The integrated lead suspension assembly structure can be used to form the suspension flexure suspension for the R/W head. It can be attached to the load beam and other suspension parts by welding or by adhesives.

As noted above, controlling the conductor proximity to metallic objects effects a control of conductor impedance. Thus, the mentioned added metal layer effectively shields the differential circuits above it, from the electrical influences exerted by the structural parts (the load beam, actuator arm, etc.). For example, tying the added metal layer with the load beam to a common potential (preferably the drive ground), limits variations in characteristic impedance of the R/W interconnects caused by changes in the structural support (such as variations in gap (x) between the load beam and the interconnect) and these variations can be minimized. The thickness of the added insulative layer, fourth layer, can be precisely maintained, thus positioning the fifth layer precisely, and limiting impedance variations irrespective of the uncertainties in the gap or spacing (x) caused by changes in the spatial relation of the interconnect and the load beam.

While the added metal layer acts as an electrical shield, it has only minimum influence on the electrical properties of the interconnect differential pairs, owing to the relatively large spacing between the added fifth layer of metal and the signal traces.

The invention in a major aspect controls impedance. As explained below, the electrical behavior (and hence the differential characteristic impedance) of a circuit can be varied by changing the lateral offset (d) between opposed trace conductor pairs of a circuit, such as between the forward and return paths of a read or write circuit. In this context, (d) can assume a positive or a negative value.

Figure 4:
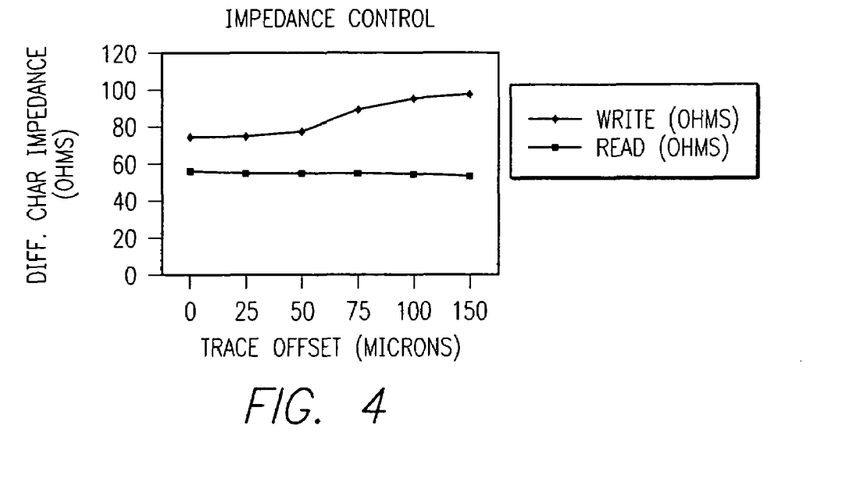
FIG. 4 is a graphical depiction of the invention impedance control on read and write circuits.
Figure 6:
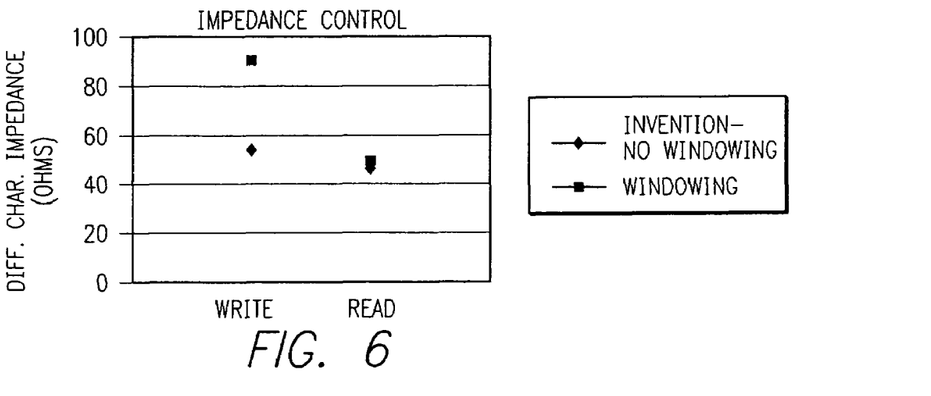

The invention provides the advantage of obtaining a constant (ripple-free) impedance that can be smoothly controlled. At the same time, the range of impedance control achieved is comparable to that of the 'windowing method' (assuming the same trace cross-section). In FIG. 4 simulation values obtained in two cases are provided wherein impedance of the write trace alone was varied using the prior art and the invention methods. In both the cases read trace geometry was kept intact. It will be noted that the change in impedance with increasing offset or (d) spacing in the write circuit is realized with little correlative change in the read circuit impedance. Similarly, it will be noted indicates that for a range of impedance control of about 30 ohms, the read circuit varied by less than about 2 ohms with the invention, see FIG. 4, having no windowing expedient, but was about three times that, at about 7 ohms, see FIG. 6, with a windowing arrangement. It is thus demonstrated that impedance control by the invention method on the write traces produces less impact on the impedance of the read traces in the invention method than heretofore obtained.

Figure 5:
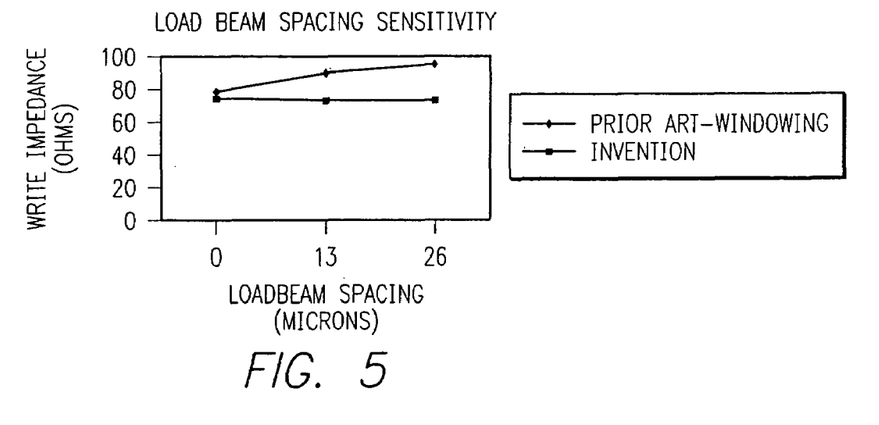
FIG. 5 is a graphical depiction of write impedance sensitivity under the invention and in the prior art at different spacings of the write circuit from the load beam; and, FIG. 6 is a graphical depiction of differential characteristic impedance under the invention and the prior art.

The sensitivity of impedance values to uncertainties in the attachment process that produce differences in load beam spacing (d) is reduced in the invention. In FIG. 5, the invention and the prior art are compared with respect to variation in the write circuit impedance caused by changes in the load beam spacing, keeping the value of (d) at zero for the invention. The data indicate that interconnects using the prior art windowing technique is more sensitive to load beam spacing than interconnects according to the invention.

Figure 1A:
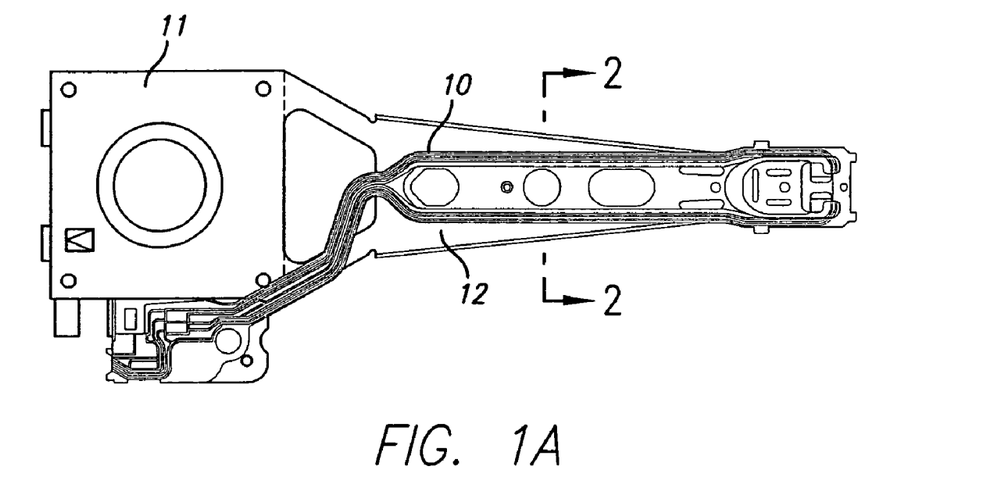
FIG. 1A is a top plan view of the invention suspension.
Figure 1B:
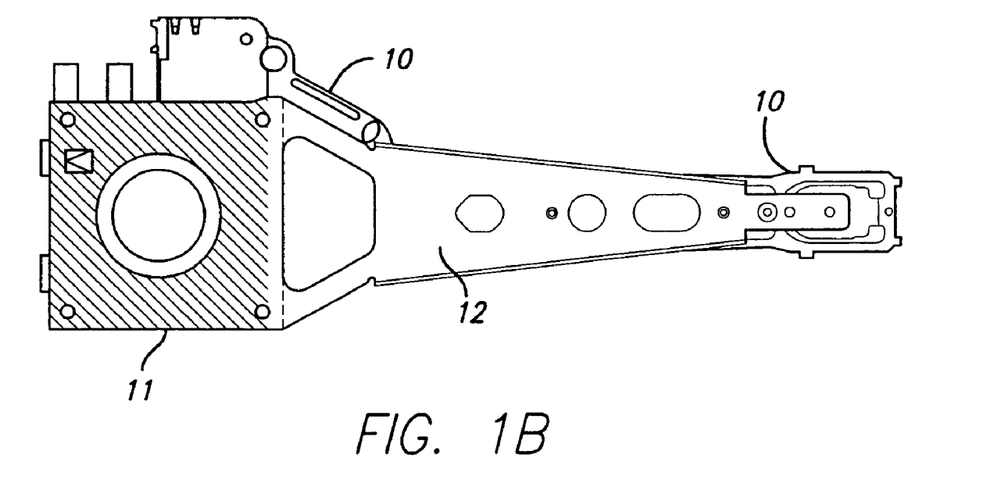
FIG. 1B is a bottom plan view thereof.
Figure 2:
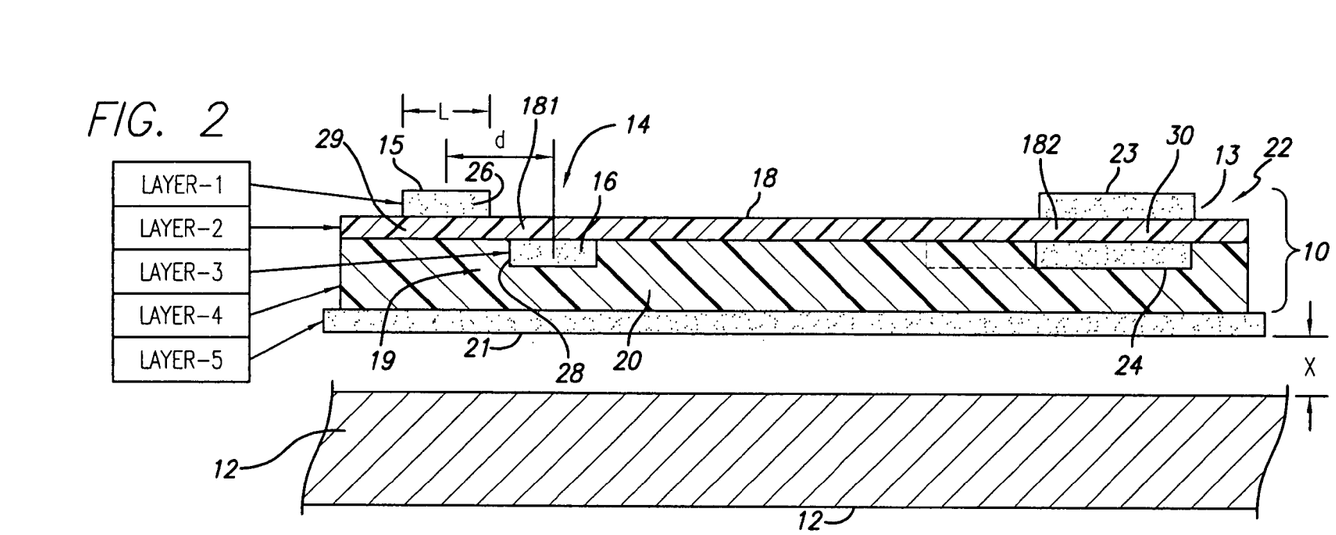
FIG. 2 is a view taken on line 2—2 in FIG. 1A.

With reference now to the drawings in detail, in FIGS. 1A, 1B and 2 the invention interconnect assembly 10 is shown disposed on and fastened to load beam 12 that has a mounting plate 11. Assembly 10 comprises a conductive metal layer 13 (LAYER-1 in FIG. 2) suitably shaped into upper conductive traces 15, 23 and typically covered by an insulative plastic abrasion protective cover layer (not shown), an electrically insulative layer usually comprising a plastic layer 18 (LAYER-2 in FIG. 2), a second conductive metal layer 19 (LAYER-3 in FIG. 2) suitably shaped into lower conductive traces 16, 24, a further insulative plastic layer 20 (LAYER-4 in FIG. 2), and a deposited, or laminated metal foil, layer 21 (LAYER-5 IN FIG. 2). Attachment of the interconnect assembly 10 to the load beam is at a spacing that is intended to be relatively uniform but which frequently varies giving rise to certain of the impedance variations discussed herein.

Figure 3:
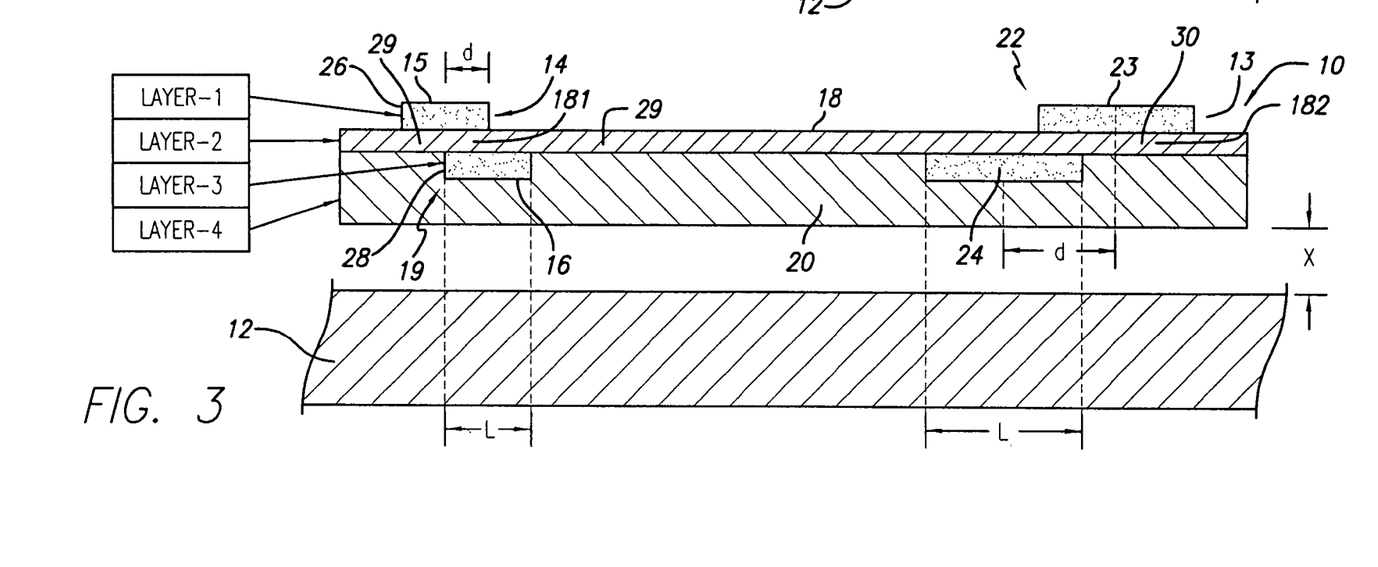
FIG. 3 is a view like FIG. 2 of an alternative embodiment.

Interconnect assembly 10, locally attached to load beam 12, comprises a write pair 14 of forward and return path conductive traces 15, 16 bracketing insulative plastic film 18, and a read pair 22 of forward and return path conductive traces 23, 24 bracketing the insulative layer 18. As shown in FIG. 2, at least one of the read and write pairs, here write pair 14 has its forward and return path conductive traces 15, 16 relatively laterally offset by a distance d measured from the center line of the traces and not equal to the distance between the respective spaced edges 26, 28 of the traces. The read pair 22 traces 23, 24 can be non-offset (FIG. 2 solid lines) or laterally offset (FIG. 2 dotted lines) alone or with the same or different lateral offset in the complementary write pair 14 traces 15, 16. Cf. FIG. 3.

The write and read conductive traces 15, 16 and 23, 24 bracket adjacent portions 29, 30 of the common insulative layer 18. Preferably, the conductive traces 15, 16 and 23, 24 comprise copper including copper alloys but other suitably conductive metal can be used.

When relatively offset (by distance d) read pair forward and return path conductive traces 23, 24 are relatively laterally offset transverse to the longitudinal axis of the assembly 10, and can each have substantially the same lateral extent and cross-section shape and areas, or different lateral extents and cross-section shapes and areas, including both rectangular and trapezoidal cross-sections. The write circuit traces 15, 16 can have a limited lateral extent to ensure that, when sufficiently laterally offset, they do not oppose each other across the insulative film layer portion 29. Preferably, the lateral offset distance d between the write path forward and return path conductive traces 15, 16 is less than the lateral extent L of the conductive traces, and the offset of the write path conductive traces 15, 16 is toward the read path conductive traces 23, 24.

The read pair 22 of forward and return path conductive traces 23, 24 are relatively located, shaped and sized as the write traces 15, 16, and can be larger than the write traces in lateral extent and cross-sectional area, as shown in FIG. 2.

With reference to FIG. 3, both the write pair 14 and the read pair 22 of forward and return path conductive traces 15, 16, 23, 24 are relatively laterally offset, the respective conductive traces of the write pair and the read pair forward and return paths having substantially the same lateral extent within the pairs, and substantially the same or different lateral extent between the pairs. Both the write pair 14 and the read pair 22 forward and return paths conductive traces 15, 16, 23, 24 can be sufficiently greatly laterally offset as to not oppose each other across the insulative layer portions 29, 30. The lateral offset distance d between the write path, the read path, or both the write path and the read path forward and return conductive traces 15, 16, 23, 24 can be less than the lateral extent L of the conductive traces, while the lateral offset distances respectively between the write pair forward and return path conductive traces 15, 16 and the read pair forward and return path conductive traces 23, 24 can be less than the lateral extent of the conductive traces making up the pair. Further, the write and read conductive trace 15, 16, 23, 24 lateral offsets d occur or are found toward the read and write path conductive traces respectively.

In a further embodiment, also shown in FIG. 2, the electrical interconnect assembly 10 further comprises a metal layer 21 adapted for grounding to the load beam 12, mounting plate 11 or other grounded object. Metal layer 21 is mounted on the insulative layer 18 in fixed spaced relation to the conductive traces 15, 16, 23, 24 to be between the interconnect assembly 10 and the load beam 12 in the assembled condition of the interconnect assembly and the load beam.

In this and further embodiments, both the write pair 15 and the read pair 22 of forward and return path conductive traces 15, 16, 23, 24 are relatively laterally offset a distance d, and one or both of the respective conductive traces of the write pair and the read pair forward and return paths have substantially the same lateral extent within the pairs, and substantially the same or different lateral extent between the pairs, one or both of the write pair and the read pair path forward and return path conductive traces are sufficiently greatly laterally offset as to not oppose each other across the insulative film, the lateral offset distance between the laterally offset write or read path forward and return path conductive traces that are offset is less than the lateral extent of the greater extending of the conductive traces, and the lateral offset distance between the write or read path forward and return path conductive traces that are offset is less than the lateral extent of the conductive traces, at least one of the read and write path conductive trace lateral offsets are toward the write and read path conductive traces respectively.

The interconnect assembly 10 can, as shown, be combined with load beam 12, typically comprised of stainless steel or other spring material. The interconnect assembly 10 is otherwise as above-described.

The invention method of making a disk drive suspension comprising a load beam 12 and an electrical interconnect assembly 10 includes supporting on an insulative layer 18 adjacent the load beam a write pair 14 of forward and return path conductive traces 15, 16 and a read pair 22 of forward and return path conductive traces 23, 24, covering the write and read pair conductive traces opposite the load beam with a further insulative layer 20, and attaching a metal layer 21 adapted for grounding to the further insulative layer in fixed spaced relation to the conductive traces to be between the assembly and the load beam.

Further, the invention provides a method of making a disk drive suspension electrical interconnect assembly 10, including supporting on an insulative layer 18 a write pair 14 of forward and return path conductive traces 15, 16 in insulative layer bracketing relation to a first portion 181 of the insulative layer and a read pair 22 of forward and return path conductive traces 23, 24 in bracketing relation to a second portion 182 of the insulative layer, and relatively laterally offsetting the conductive traces of at least one the read and write pairs a distance d.

Further, the invention provides a method of making a disk drive suspension comprising a metal load beam 12 and an electrical interconnect assembly 10, including supporting on an insulative plastic layer 18 a write pair 14 of forward and return path conductive traces 15, 16 and a read pair 22 of forward and return path conductive traces 23, 24, in bracketing relation if desired, relatively laterally offsetting the conductive traces of at least one of the read and write pairs, and attaching a metal layer 21 adapted for grounding to the insulative plastic layer in fixed spaced relation to the conductive traces to be between the assembly and the load beam 12.

Figure 7:
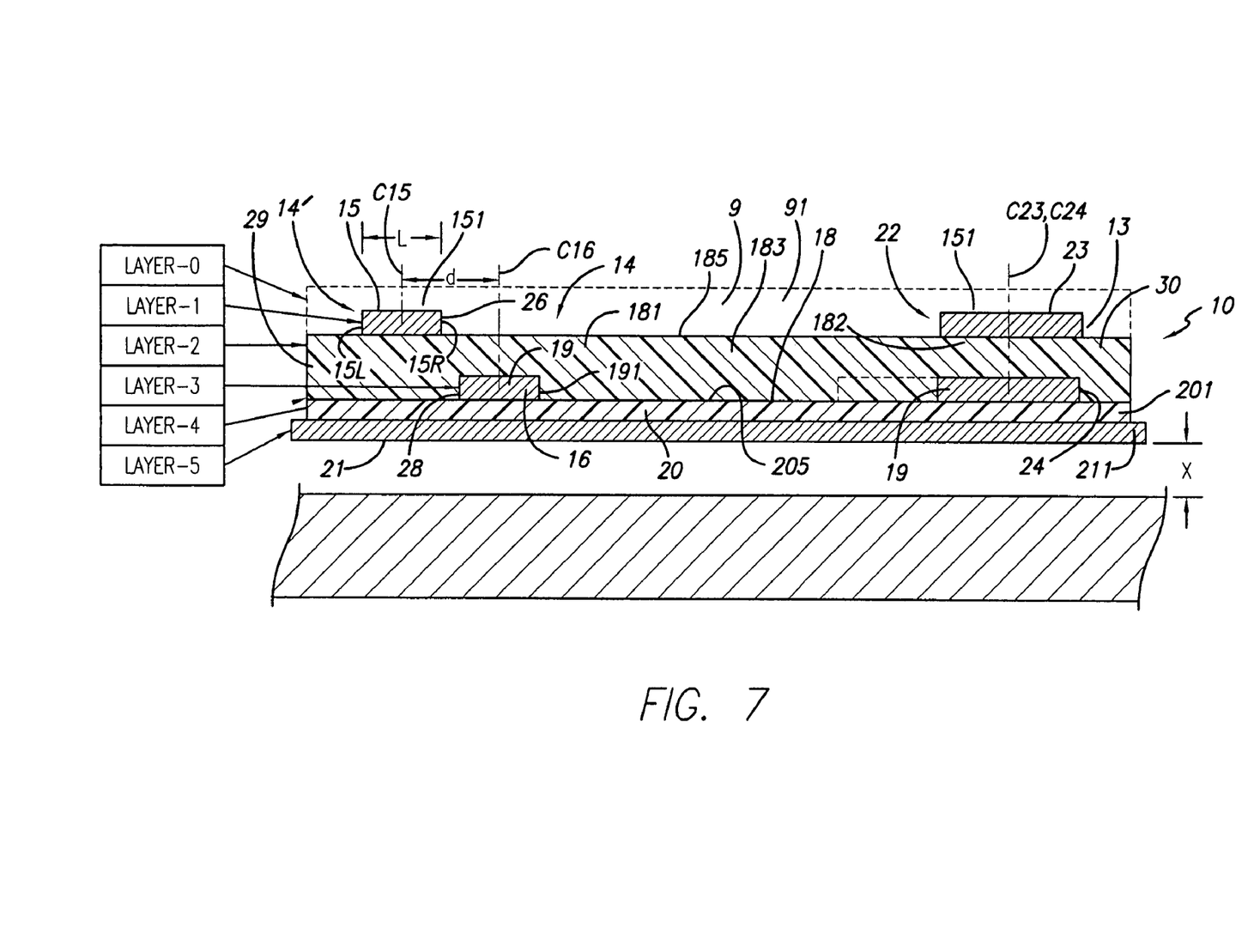
FIG. 7 is a view like FIG. 2 of an additive embodiment.
Figure 8:
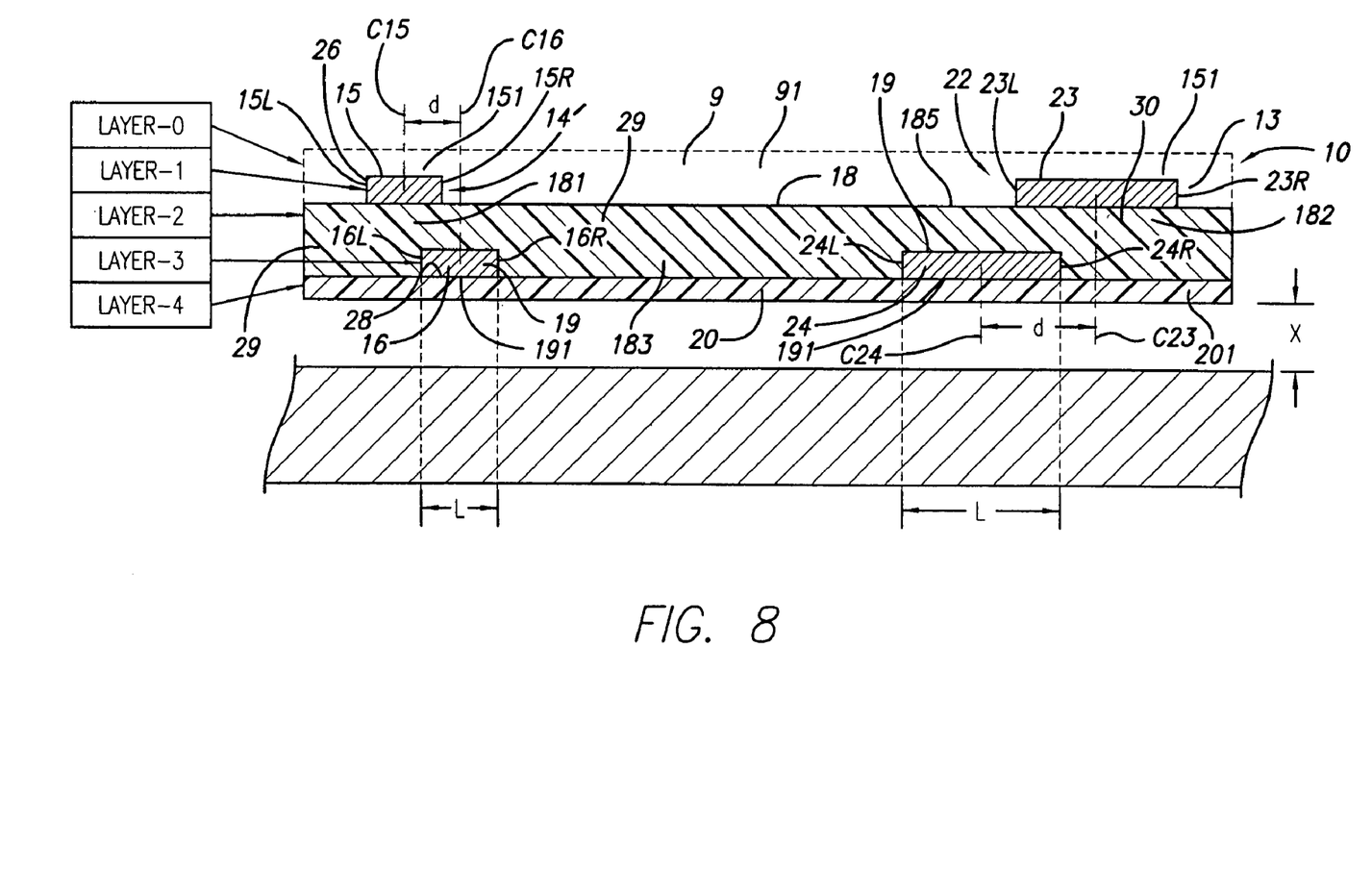
FIG. 8 is a view like FIG. 7 of an alternative additive embodiment.

With particular reference to the additive mode embodiments of the invention, shown in FIGS. 7 and 8 wherein like numbers indicate like parts, except as note, the foregoing description of the invention and the description of FIGS. 1–3 is applicable to the FIGS. 7 and 8 embodiments except as flows from the fabrication of the interconnect assembly in an additive, non-subtractive manner. The FIGS. 7 and 8 embodiments differ in the presence or not of the base metal layer 21 which is omitted initially or removed after fabrication in the FIG. 8 embodiment, and in the different offsets shown. In FIG. 7, an additive-mode fabricated disk drive suspension electrical interconnect assembly is shown at 10 adapted to be supported on a disk drive suspension load beam 12 supported, e.g., by a mounting plate (not shown). Interconnect assembly 10 comprises a fifth layer 21 (LAYER-5) comprising metal, suitably a metal foil 211. A fourth assembly layer 20 (LAYER-4) is disposed on the fifth layer 21. The fourth layer 20 comprises an electrically insulative layer, suitably a plastic layer 201 preferably comprising a polyimide precursor or a polyimide. Plastic fourth layer 20 has a first face 205 directed away from the fifth layer metal foil 21. A third assembly layer 19 (LAYER-3) is directly attached to the plastic fourth layer first face 205. Assembly third layer 19 comprises a first subset 191 of one or more conductive trace pair members 16, 24. An assembly second layer 18 (LAYER-2) is disposed on the third and fourth layers 19, 20. The assembly second layer 18 comprises an insulative material 183, typically a polyimide precursor or a polyimide, and has a second face 185 directed away from the third layer 19. An assembly first layer 13 (LAYER-1) is directly attached to the second layer material 18. Assembly first layer 13 comprises a second subset 151 of one or more conductive trace pair members 15, 23 in spaced, paired and laterally offset relation respectively with the one or more first subset 191 of pair members 16, 24.

Preferably, the fourth layer 20 and the second layer 18 each comprise polyimide, and the conductive trace 16, 24, 15, 23 of layers 19, 15 respectively each comprise copper. First and second subsets 191, 151 of conductive trace pair members 19, 15 define the write pair 14' of forward and return path conductive traces 15, 16 and the read pair 22' of forward and return path conductive traces 23, 24. The write pair 14' of traces 15, 16 have centerlines C15, C16 that are relatively laterally offset a distance d. Typically, the write pair forward and return path conductive traces 15, 16 have substantially the same lateral extent L. Further, the write pair 14' forward and return path conductive traces 15, 16 have left and right edges 15L, 15R, 16L and 16R; These trace edges are typically sufficiently greatly laterally offset that the traces do not oppose each other, as shown, while the lateral offset distance d between the write path forward and return path conductive traces 15, 16 is less than the lateral extent L of the less wide of the conductive traces, and the write path conductive trace lateral offset is toward the read path conductive traces 23, 24.

The read pair 22' forward and return path conductive traces 23, 24 have centerlines C23, C24 that are relatively laterally offset a distance d which is zero in FIG. 7 and a positive integer in FIG. 8. A with the write pair 14', the read pair 22' forward and return path conductive traces 23, 24 typically have substantially the same lateral extent L. And the read pair forward and return path conductive traces have left and right edges, 23L, 23R, 24L and 24R; these trace edges are typically not offset (FIG. 7) or are slightly or at least and not completely offset (FIG. 8). As in the write pair 14' case, the read path conductive trace 23, 24 lateral offset is toward the write path conductive traces 15, 16.

Considering both the read and write pairs 14', 22', the invention electrical interconnect assembly 10 typically has the respective conductive traces of the write pair 15, 16 and the read pair forward and return path traces 23, 24 with substantially the same lateral extent L within the pairs, and substantially the same or different lateral extent L between the pairs.

The FIG. 8 embodiment provides the electrical interconnect assembly 10 with a ground comprising the metal layer 211 in fixed spaced relation to the conductive traces 15, 16, 23, 24 and between the balance of the assembly 10 and the load beam 12.

In a specific embodiment, the invention provides an electrical interconnect assembly 10 in which one or both of the write pair 14' and the read pair 22' of forward and return path conductive traces 15, 16, 23, 24 have centerlines C15, C16, C23, C24 and left and right edges 15L, R, 16 L, R, 23L, r and 24l, R, wherein at least one of the centerlines, left edges and right edges of the conductive traces are relatively laterally offset.

The FIGS. 7 and 8 embodiments can further comprise the noted zero layer 9 atop the second and first layers, the zero layer comprising an electrically insulative material 91, generally comprising a polyimide or a polyimide precursor.

The term polyimide precursor herein refers to a material which becomes a polyimide upon suitable processing. For example, an intermediate to a polyimide: polyamic acid can be obtained by the polycondensation of an aromatic dianhydride (e.g. pyromellitic dianhydride) and an aromatic diamine (e.g. 4,4'-diamino diphenyl ether), and the polyamic acid can be converted by dehydration at high temperatures to a polyimide which when fully imidized provides an excellent electrical insulation. In the invention, typically the polyamic acid is cast upon the substrate and converted in situ, but a fluid polyimide can be used similarly, e.g. a soluble polyimide in an appropriate solvent to form the polyimide layers discussed herein.

In the FIGS. 7 and 8 methods of fabricating a disk drive suspension interconnect assembly 10 there is included providing a fifth layer 21 comprising metal 211, depositing onto the fifth layer a fourth layer 20 comprising a polyimide precursor layer 201, converting the fourth layer to polyimide having a first face 205 directed away from the fifth layer, forming a third layer 19 comprising a first subset 191 of one or more conductive trace pair members 16, 24 directly attached to the first face, depositing onto the fourth layer 20 and the third layer 19 a second layer 18 comprising a polyimide precursor 183 and converting the second layer to polyimide having a second face 185 directed away from the third layer, and forming a first layer 13 comprising a second subset 151 of one or more conductive trace pair members 15, 23 directly attached to the second face 185 in spaced, paired and laterally offset relation respectively with the one or more first subset pair members. Typically, in this and like embodiments, there can be included adding a zero layer 9 comprising an electrically insulative material 91 onto the first and second layers 9, 18.

In further aspects of the invention, the conductive trace members 15, 16, 23, 24 each have a center line C15, C16, C23, C24, and there is included also laterally offsetting the centerlines of at least one of the paired members in lateral offset defining relation, and/or laterally offsetting the centerlines of each of the paired members in lateral offset defining relation. Further, the conductive trace members each have left and right edges 15L, R, 16L, R, 23L, R and 24L, R, and the invention method includes laterally offsetting at least one left or right edge of each paired member in lateral offset defining relation, laterally offsetting both the left and right edges of at least one of the paired members, laterally offsetting at least one left and right edge of each of the paired members in lateral offset defining relation, or laterally offsetting both the left and right edges of at least one of the paired members. Alternatively, the invention method further includes each conductive trace member 15, 16, 23, 24 having a center line C15, etc., and includes also laterally offsetting the centerlines of at least one of the paired members in lateral offset defining relation, and laterally offsetting the centerlines of each of the paired members in lateral offset defining relation.

In another aspect, the method includes selecting a polyamic acid as the polyimide precursor as the fourth and second layers, 20, 18 and 9 in the above embodiments, and converting the polyamic acid e.g. by dehydration to a polyimide.

The zero layer 9 can be added onto the first and second layers 13, 18 and can comprise an electrically insulative and abrasion resistant material 91, and, for the purpose, the invention methods includes selecting a polyimide precursor as the zero layer, such as a polyamic acid, and converting the polyamic acid to a polyimide.

In a further aspect, the invention method in some embodiments includes attaching a layer 21 of metal 211 for grounding to the interconnect assembly 10 in fixed spaced relation to the conductive trace pair members 14', 22'.

The invention thus provides an improved disk drive suspension and an electrical interconnect for a disk drive suspension having improved impedance control for reduced cross talk through opposing the circuit pair members in a novel manner involving offset partly or fully of the opposed pair members, and for reduced effect of the load beam spacing through the use of a grounding layer of metal at a fixed spacing from the trace conductors although at a varied spacing from the trace conductors. The invention further provides a read pair of forward and return path conductive traces on or bracketing an insulative layer, such as a plastic film layer in which the pair members are relatively laterally offset to control impedance including differentially between read and write pairs, and in which the effects of load beam spacing are controlled through the use of a metal layer constantly spaced from the traces and spaced as well from the load beam. The invention further provides an electrical interconnect geometry that enhances electrical coupling between the forward and return paths of a differential circuit thereby making it less sensitive to exterior factors and cross-talk noise, provision of a geometry that allows enhancement of capacitive coupling between the forward and return paths of a differential circuit, thereby making possible the realization of very low impedance interconnects, provision of a vertically stacked interconnect geometry that allows more circuits to be packed in a given area, provision of a shield that is electrically commonly grounded with the load beam to nearby metallic objects and supports supporting the interconnect structure and that maintains a constant spacing from the differential circuit, the shield protecting the differential circuits from impedance variations caused by a non-uniform attachment process with the metallic supports, such as load beams and arms, provision of ripple-free differential characteristic impedance through homogenous shielding and uniform trace cross-sectional geometry, provision of smooth and continuous control of differential impedance by setting the offset parameter to the desired value, provision of impedance control in which changing the impedance of a certain differential pair does not significantly affect the impedance of adjacent pairs, and provision of a flexure through the interconnect assembly.

The foregoing objects are thus met.

We claim:

1. A method of fabricating a disk drive suspension interconnect assembly, including providing a fifth layer comprising metal, depositing onto said fifth layer a fourth layer comprising a polyimide precursor, converting said fourth layer to polyimide having a first face directed away from said fifth layer, forming a third layer comprising a first subset of one or more conductive trace pair members directly attached to said first face, depositing onto said fourth and third layers a second layer comprising a polyimide precursor and converting said second layer to polyimide having a second face directed away from said third layer, and forming a first layer comprising a second subset of one or more conductive trace pair members directly attached to said second face in spaced, paired, laterally offset and overlapping relation with their centerlines offset respectively with said one or more first subset pair members.

2. The method according to claim 1, including also adding a zero layer comprising an electrically insulative material onto said first and second layers.

3. The method according to claim 1, in which each said conductive trace member has a center line, and including also laterally offsetting said centerlines of at least one of said paired members in lateral offset defining relation.

4. The method according to claim 3, including also laterally offsetting said centerlines of each of said paired members in lateral offset defining relation.

5. The method according to claim 1, in which each said member has left and right edges, and including also laterally offsetting at least one left or right edge of each said paired member in lateral offset defining relation.

6. The method according to claim 5, including also laterally offsetting both the left and right edges of at least one of said paired members.

7. The method according to claim 6, including also laterally offsetting at least one left and right edge of each of said paired members in lateral offset defining relation.

8. The method according to claim 7, including also laterally offsetting both the left and right edges of at least one of said paired members.

9. The method according to claim 5, in which each said conductive trace member has a center line, and including also laterally offsetting said centerlines of at least one of said paired members in lateral offset defining relation.

10. The method according to claim 9, including also laterally offsetting said centerlines of each of said paired members in lateral offset defining relation.

11. The method according to claim 1, including also selecting a polyamic acid as said polyimide precursor.

12. The method according to claim 3, including also selecting a polyamic acid as said polyimide precursor.

13. The method according to claim 5, including also selecting a polyamic acid as said polyimide precursor.

14. The method according to claim 9, including also selecting a polyamic acid as said polyimide precursor.

15. The method according to claim 5, including also adding a zero layer onto said first and second layers, said zero layer comprising an electrically insulative material.

16. The method according to claim 15, including also selecting a polyimide precursor as said zero layer.

17. The method according to claim 16, including also selecting polyamic acid as said polyimide precursor.

18. The method according to claim 17, including also converting said polyamic acid to a polyimide.

19. The method according to claim 9, including also adding a zero layer onto said first and second layers, said zero layer comprising an electrically insulative material.

20. The method according to claim 19, including also selecting a polyimide precursor as said zero layer.

21. The method according to claim 20, including also selecting polyamic acid as said polyimide precursor.

22. The method according to claim 21, including also converting said polyamic acid to a polyimide.

23. A method of fabricating a disk drive suspension interconnect assembly, including providing a supporting fifth layer, depositing onto said fifth layer a fourth layer comprising a polyimide precursor, converting said fourth layer to polyimide having a first face directed away from said fifth layer, forming a third layer comprising a first subset of one or more conductive trace pair members directly attached to said first face, depositing onto said fourth and third layers a second layer comprising a polyimide precursor and converting said second layer to polyimide having a second face directed away from said third layer, forming a first layer comprising a second subset of one or more conductive trace pair members directly attached to said second face in spaced, paired and laterally offset relation respectively with said one or more first subset pair members, and removing said fifth supporting layer.

24. The method according to claim 23, including selecting a metal layer adapted for grounding as said fifth layer and maintaining said fifth layer on said interconnect assembly in fixed spaced relation to said conductive trace pair members.

25. A disk drive suspension electrical interconnect assembly adapted to be supported on a disk drive suspension load beam, said interconnect assembly comprising a fifth layer comprising metal, a fourth layer on said fifth layer, said fourth layer comprising a polyimide precursor or a polyimide, said fourth layer having a first face directed away from said fifth layer, a third layer directly attached to said first face, said third layer comprising a first subset of one or more conductive trace pair members, a second layer on said third and fourth layers, said second layer comprising a polyimide precursor or a polyimide, said second layer having a second face directed away from said third layer, and a first layer directly attached to said second layer, said first layer comprising a second subset of one or more conductive trace pair members in spaced, paired, laterally offset and overlapping relation with their centerlines offset respectively with said one or more first subset pair members.

26. In combination: the disk drive suspension electrical interconnect assembly according to claim 25, and a load beam.

27. The disk drive suspension electrical interconnect assembly according to claim 25, in which said fourth layer and said second layer comprise polyimide.

28. The disk drive suspension electrical interconnect assembly according to claim 25, in which said conductive traces comprise copper.

29. The disk drive suspension electrical interconnect assembly according to claim 25, in which said first and second subsets of conductive trace pair members define a write pair of forward and return path conductive traces and a read pair of forward and return path conductive traces, said write pair of traces having centerlines that are relatively laterally offset.

30. The disk drive suspension electrical interconnect assembly according to claim 29, in which said write pair forward and return path conductive traces have substantially the same lateral extent.

31. The disk drive suspension electrical interconnect assembly according to claim 29, in which the lateral offset distance between said write path forward and return path conductive traces is less than the lateral extent of the less wide of said conductive traces.

32. The disk drive suspension electrical interconnect assembly according to claim 29, in which said write path conductive trace lateral offset is toward said read path conductive traces.

33. The disk drive suspension electrical interconnect assembly according to claim 29, in which said read pair forward and return path conductive traces have centerlines that are relatively laterally offset.

34. The disk drive suspension electrical interconnect assembly according to claim 29, in which said read pair forward and return path conductive traces have substantially the same lateral extent.

35. The disk drive suspension electrical interconnect assembly according to claim 29, in which said read path conductive trace lateral offset is toward said write path conductive traces.

36. The disk drive suspension electrical interconnect assembly according to claim 29, in which the respective conductive traces of said write pair and said read pair forward and return paths have substantially the same lateral extent within said pairs, and substantially the same or different lateral extent between said pairs.

37. The disk drive suspension electrical interconnect assembly according to claim 26, said assembly further comprising a metal layer adapted for grounding in fixed spaced relation to said conductive traces to be between said assembly and said load beam.

38. The disk drive suspension electrical interconnect assembly according to claim 25, in which one or both of said write pair and said read pair of forward and return path conductive traces have left and right edges, at least one of said left edges and right edges of said conductive traces being relatively laterally offset.

39. In combination: the disk drive suspension electrical interconnect assembly according to claim 38, and a load beam.

40. The disk drive suspension electrical interconnect assembly according to claim 25, further comprising a zero layer atop said second and first layers, said zero layer comprising an electrically insulative material.

41. The disk drive suspension electrical interconnect assembly according to claim 40, in which said zero layer electrically insulative material comprises a polyimide.

42. A disk drive suspension electrical interconnect assembly adapted to be supported on a disk drive suspension load beam, said interconnect assembly comprising a fourth layer, said fourth layer comprising a polyimide precursor or a polyimide, said fourth layer having a first face, a third layer directly attached to said first face, said third layer comprising a first subset of one or more conductive trace pair members, a second layer on said third and fourth layers, said second layer comprising a polyimide precursor or a polyimide, said second layer having a second face, and a first layer directly attached to said second layer, said first layer comprising a second subset of one or more conductive trace pair members in spaced, paired, laterally offset and overlapping relation with their centerlines offset respectively with said one or more first subset pair members.

43. In combination: the electrical interconnect assembly according to claim 42, and a load beam.

44. The combination according to claim 43, including also a grounding metal layer between said assembly and said load beam.

\* \* \* \* \*